US012500676B2

(12) United States Patent
Sudo et al.

(10) Patent No.: US 12,500,676 B2
(45) Date of Patent: Dec. 16, 2025

(54) COMMUNICATION APPARATUS

(71) Applicant: Murata Manufacturing Co., Ltd., Nagaokakyo (JP)

(72) Inventors: Kaoru Sudo, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 429 days.

(21) Appl. No.: 18/109,279

(22) Filed: Feb. 14, 2023

(65) Prior Publication Data
US 2023/0188223 A1  Jun. 15, 2023

Related U.S. Application Data

(63) Continuation of application No. PCT/JP2021/022030, filed on Jun. 10, 2021.

(30) Foreign Application Priority Data

Aug. 19, 2020 (JP) ................... 2020-138591

(51) Int. Cl.
*H01Q 9/04* (2006.01)
*H01Q 1/22* (2006.01)
*H01Q 1/24* (2006.01)
*H04B 1/40* (2015.01)
*H04B 15/00* (2006.01)

(52) U.S. Cl.
CPC ............... *H04B 15/00* (2013.01); *H04B 1/40* (2013.01)

(58) Field of Classification Search
None
See application file for complete search history.

(56) References Cited

U.S. PATENT DOCUMENTS

| 8,089,409 B2 * | 1/2012 | Shibata | H01Q 9/0407 343/700 MS |
| 9,577,317 B2 * | 2/2017 | Kim | H01Q 1/526 |
| 9,735,826 B2 * | 8/2017 | Sohn | H05K 7/20445 |
| 10,141,625 B1 * | 11/2018 | Ryu | H01Q 1/2291 |
| 10,566,675 B2 * | 2/2020 | Ryu | H05K 7/20472 |
| 10,868,368 B2 * | 12/2020 | Sakurai | H01Q 21/065 |

(Continued)

FOREIGN PATENT DOCUMENTS

| EP | 3621154 A1 | 3/2020 |
| JP | 10-233621 A | 9/1998 |

(Continued)

OTHER PUBLICATIONS

International Search Report and Written Opinion mailed on Aug. 31, 2021, received for PCT Application PCT/JP2021/022030, filed on Jun. 10, 2021, 8 pages including English Translation.

*Primary Examiner* — Tuan A Tran
(74) *Attorney, Agent, or Firm* — XSENSUS LLP

(57) ABSTRACT

A communication apparatus includes: an antenna module provided with an antenna element having a flat plate shape; a housing that accommodates the antenna module; a heat dissipation plate; and an electrode. The heat dissipation plate is disposed between the housing and the antenna module, and provided with an opening that faces the antenna element. The electrode faces the antenna element in a direction normal to the antenna element and on a side of the first radiating element that radiates the radio wave.

18 Claims, 12 Drawing Sheets

(56) References Cited

U.S. PATENT DOCUMENTS

| | | | | |
|---|---|---|---|---|
| 11,013,150 B2* | 5/2021 | Kim | .................. | H05K 7/205 |
| 11,284,538 B2* | 3/2022 | Kwon | .................. | G06F 1/203 |
| 11,309,621 B2* | 4/2022 | Baek | .................. | H01Q 1/526 |
| 11,581,662 B2* | 2/2023 | Yoon | .................. | H01Q 21/28 |
| 11,831,071 B2* | 11/2023 | Yun | .................. | H01Q 1/523 |
| 11,888,242 B2* | 1/2024 | Yang | .................. | H01Q 1/38 |
| 12,062,853 B2* | 8/2024 | Baek | .................. | H01Q 1/246 |
| 2018/0288908 A1* | 10/2018 | Lee | .................. | H05K 9/0088 |
| 2018/0337456 A1* | 11/2018 | Liu | .................. | H01Q 21/0075 |
| 2018/0358710 A1* | 12/2018 | Toyao | .................. | H01Q 15/148 |
| 2019/0051967 A1 | 2/2019 | Ryu et al. | | |
| 2020/0161766 A1* | 5/2020 | Liu | .................. | H01Q 9/045 |
| 2020/0168977 A1* | 5/2020 | Son | .................. | H04M 1/0277 |
| 2021/0029818 A1* | 1/2021 | Yoon | .................. | H05K 3/281 |

FOREIGN PATENT DOCUMENTS

| | | |
|---|---|---|
| JP | 2012-175422 A | 9/2012 |
| JP | 2014-212361 A | 11/2014 |
| WO | 2014/196144 A1 | 12/2014 |
| WO | 2018/074378 A1 | 4/2018 |
| WO | 2020/031875 A1 | 2/2020 |

\* cited by examiner (a)

(b)

(a)

(b)

(c)

US 12,500,676 B2

COMMUNICATION APPARATUS

CROSS-REFERENCE TO RELATED APPLICATIONS

The present application is a continuation of International Application No. PCT/JP2021/022030, filed Jun. 10, 2021, which claims priority to Japanese Patent Application No. 2020-138591, filed in the Japanese Patent Office on Aug. 19, 2020, the entire contents of each of which is incorporated herein by reference in its entirety.

TECHNICAL FIELD

The present disclosure relates to a communication apparatus, and more particularly to installation of an antenna inside the communication apparatus.

BACKGROUND ART

Japanese Patent Laid-Open No. 2014-212361 (PTL 1) discloses an electronic device having a microstrip antenna provided therein.

CITATION LIST

Patent Literature

PTL 1: Japanese Patent Laid-Open No. 2014-212361

SUMMARY

Technical Problems

A communication apparatus that is the electronic device having an antenna provided therein is required to have heat dissipation performance since the antenna generates heat. In particular, the communication apparatus is required to prevent its housing from becoming heated to a point where it jeopardizes performance of electronic components therein.

Examples of a method of dissipating heat generated from an antenna includes a method of causing heat to leak via a heat dissipation plate having high heat conductivity like metal and provided inside the communication apparatus.

However, as recognized by the present inventors, under a condition the heat dissipation plate made of a conductive material such as metal is provided between the housing and the antenna so as to prevent heating of the housing, the heat dissipation plate acts as a shield for blocking radio frequency (RF) waves, which may degrade the function of the communication apparatus.

The present disclosure has been made in order to solve the above-described, and other, problems. One aspect of the present disclosure is to provide a communication apparatus capable of suppressing degradation in functionality while suppressing heating of a housing.

Solutions to Problems

Accordingly, on non-limiting communication apparatus includes: an antenna module provided with an antenna element having a flat plate shape; a housing that accommodates the antenna module; a heat dissipation plate; and an electrode. The heat dissipation plate is disposed between the housing and the antenna module, and provided with an opening that faces the antenna element. The electrode faces the antenna element in a direction normal to the antenna element and on a side of the first radiating element that radiates the radio wave.

Advantageous Effects of Disclosure

According to the communication apparatus of the present disclosure, since the heat dissipation plate is disposed between the housing and the antenna module, the heat generated from the antenna module is dissipated by the heat dissipation plate, so that heating of the housing can be suppressed. Further, the electrode is disposed to face the radiating element, and thus, the electrode functions as a passive element. As a consequence, the electrode surface serves as a radiation surface of the antenna module. As a result, the radio waves shielded by the heat dissipation plate are reduced, so that degradation in function of the communication apparatus can be suppressed.

DESCRIPTION OF EMBODIMENTS

Figure 1:
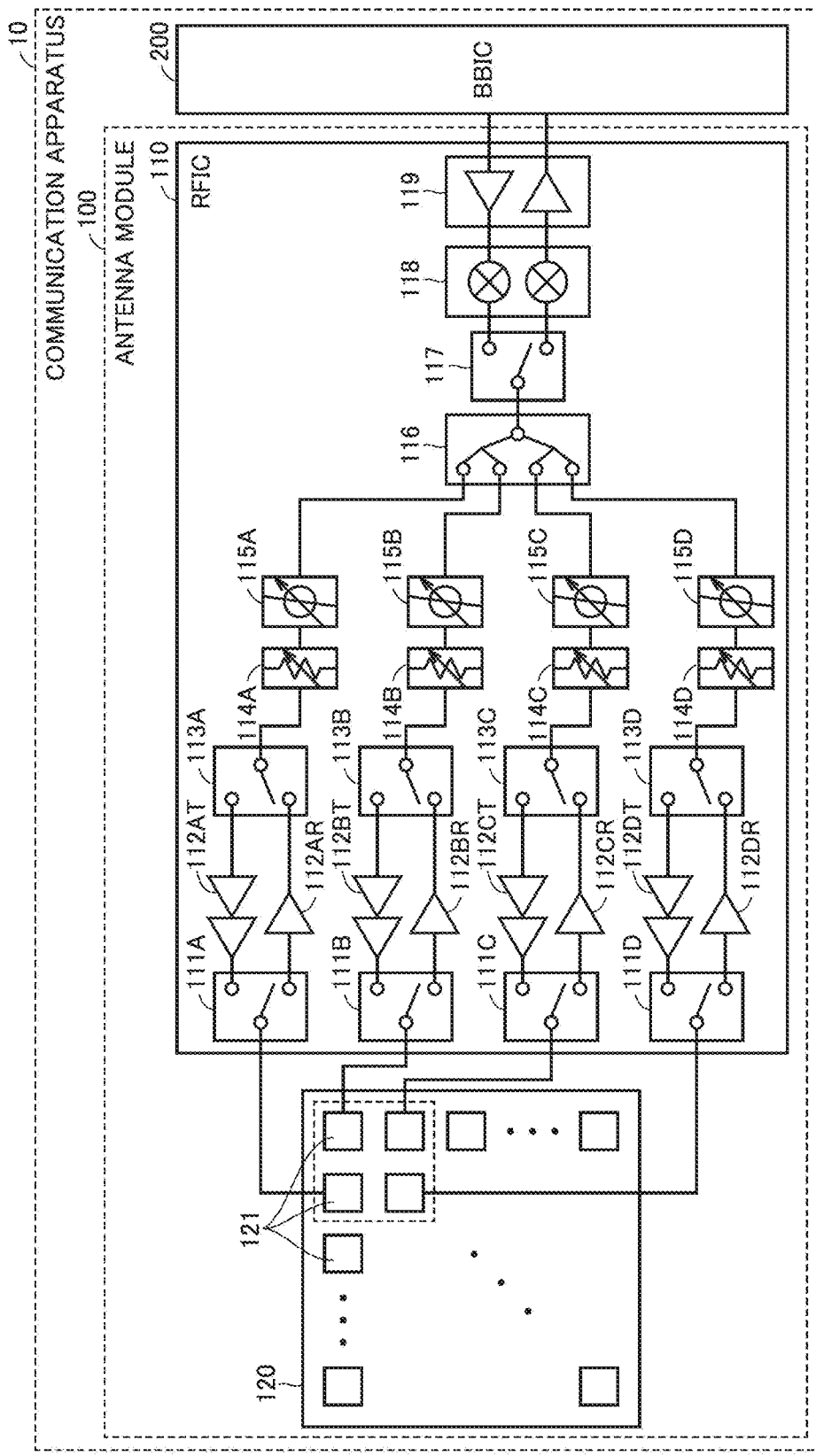
FIG. 1 is an example of a block diagram of a communication apparatus according to a present embodiment.

Hereinafter, embodiments of the present disclosure will be described in detail with reference to the accompanying drawings. In the accompanying drawings, the same or corresponding portions are denoted by the same reference characters, and the description thereof will not be repeated.

[Basic Configuration of Communication Apparatus]

FIG. 1 is an example of a block diagram of a communication apparatus 10 according to the present embodiment. Communication apparatus 10 is a mobile terminal having an approximately flat plate shape, for example, such as a smartphone or a tablet computer.

Referring to FIG. 1, communication apparatus 10 includes an antenna module 100 and a BBIC 200 constituting a baseband signal processing integrated circuit (BBIC). Antenna module 100 includes: a radio frequency integrated circuit (RFIC) 110 as an example of RF circuitry; and an antenna device 120. Communication apparatus 10 up-converts a signal, provided by BBIC 200 to antenna module 100, into a RF signal to radiate the up-converted RF signal from antenna device 120, and also, down-converts an RF signal received by antenna device 120 to process the down-converted signal in BBIC 200.

The frequency band of the radio wave used in antenna module 100 according to the present embodiment is, for example, a frequency band higher than 6 GHz and typically a millimeter-wave band called "Frequency Range 2 (FR2)". The frequency band of FR2 is 24.25 GHz to 52.6 GHz, for example. The frequency band of the radio wave used in antenna module 100 may be a frequency band of 6 GHz or less.

For ease of explanation, FIG. 1 shows only the configurations corresponding to four antenna elements 121 among a plurality of antenna elements (radiating elements) 121 constituting antenna device 120 but does not show the configurations corresponding to other antenna elements 121 having the same configuration. FIG. 1 shows an example in which antenna device 120 is formed of a plurality of antenna elements 121 arranged in a two-dimensional array, but antenna device 120 does not necessarily have to be formed of a plurality of antenna elements 121 and may be formed of one antenna element 121. Also, a one-dimensional array in which a plurality of antenna elements 121 are arranged in a line may be employed. In the present embodiment, antenna element 121 will be described by way of example as a patch antenna having a substantially square flat plate shape, but antenna element 121 may be a dipole antenna or a monopole antenna. Further, antenna element 121 may be a dipole antenna or a monopole antenna in combination with a patch antenna.

RFIC 110 includes switches 111A, 111B, 111C, and 111D, 113A, 113B, 113C, and 113D, and 117, power amplifiers 112AT, 112BT, 112CT, and 112DT, low-noise amplifiers 112AR, 112BR, 112CR, and 112DR, attenuators 114A, 114B, 114C, and 114D, phase shifters 115A, 115B, 115C, and 115D, a signal combiner/splitter 116, a mixer 118, and an amplifier circuit 119.

When a radio frequency signal is transmitted, switches 111A to 111D and 113A to 113D are switched to the side of power amplifiers 112AT to 112DT, and switch 117 is connected to an amplifier on the transmitting side of amplifier circuit 119. When a radio frequency signal is received, switches 111A to 111D and 113A to 113D are switched to the side of low-noise amplifiers 112AR to 112DR, and switch 117 is connected to an amplifier on the receiving side of amplifier circuit 119. The switching is computer or circuitry controlled.

The signal transmitted from BBIC 200 is amplified by amplifier circuit 119 and up-converted by mixer 118. The transmission signal that is the up-converted radio frequency signal is split into four parts by signal combiner/splitter 116, which then are respectively passed through four signal paths so as to be supplied to different antenna elements 121. At this time, amounts of phase shifts imparted by phase shifters 115A to 115D disposed on the respective signal paths are individually adjusted, and thereby, the directivity of antenna device 120 can be adjusted. Further, attenuators 114A to 114D each adjust the strength of the transmission signal.

The reception signals, each of which is the radio frequency signal received by each antenna element 121, respectively pass through four different signal paths and are combined by signal combiner/splitter 116. The combined reception signal is down-converted by mixer 118, amplified by amplifier circuit 119, and then transmitted to BBIC 200.

RFIC 110 is formed, for example, as an integrated circuit component on one chip that has the above-mentioned circuit configuration. Alternatively, devices (a switch, a power amplifier, a low-noise amplifier, an attenuator, and a phase shifter) respectively corresponding to antenna elements 121 in RFIC 110 may be formed as integrated circuit components on one chip for each corresponding antenna element 121.

Figure 2:
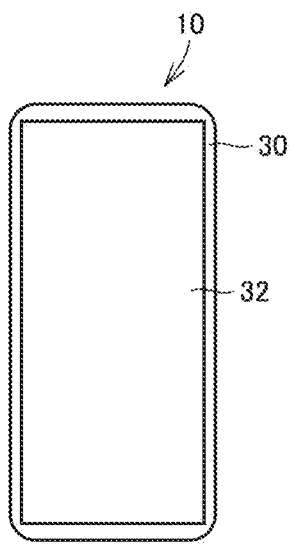
FIG. 2 includes two related sub-figures, FIG. 2(a), and FIG. 2(b), and is an external view of the communication apparatus.
Figure 2:
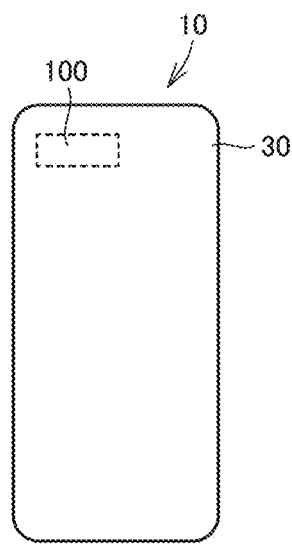

FIG. 2 is an external view of communication apparatus 10. In FIG. 2, an upper area (FIG. 2(a)) is a front view of communication apparatus 10, and a lower area (FIG. 2(b)) is a rear view of communication apparatus 10. In the present embodiment, communication apparatus 10 is a smartphone by way of example and has a housing 30 that accommodates antenna module 100. In the example shown in FIG. 2, antenna module 100 is accommodated in housing 30 on the rear side where a display 32 is not disposed and is disposed so as to radiate radio waves from the rear side where display 32 is not disposed. Note that the position in which antenna module 100 is accommodated is not limited to the position shown in FIG. 2.

As described with reference to FIG. 1, antenna module 100 includes RFIC 110 as a power supply circuit, and RFIC 110 includes power amplifiers 112AT to 112DT and low-noise amplifiers 112AR to 112DR, and thus, heat is generated from RFIC 110. Accordingly, in order to prevent heating (e.g., a perceptible amount of heating) of housing 30, communication apparatus 10 is configured to dissipate heat before the heat from antenna module 100 is transmitted to housing 30.

When a heat dissipation plate such as a metal plate is provided between housing 30 and antenna module 100 in order to prevent heating of housing 30, the heat dissipation plate acts as a shield for blocking radio waves, which may degrade the function of communication apparatus 10.

The following describes installation of antenna module 100 that suppresses degradation in function of communication apparatus 10 while suppressing heating of housing 30.

First Embodiment (Arrangement of Antenna Module 100)

Figure 3:
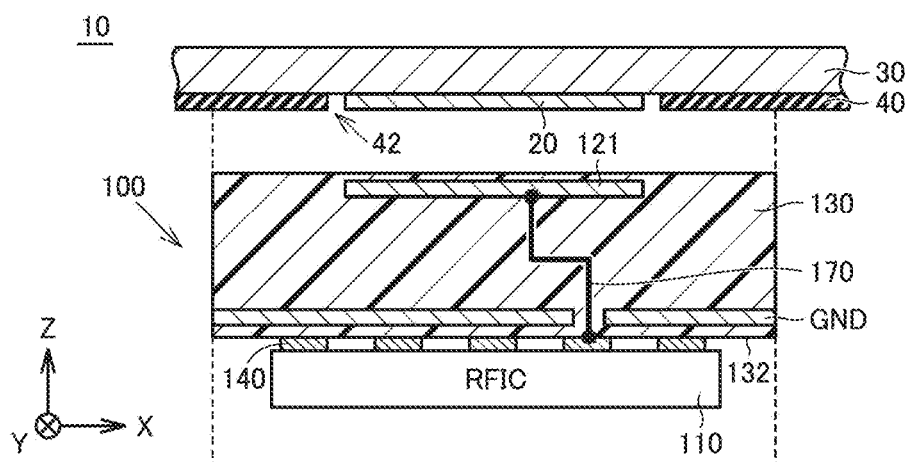
FIG. 3 includes three related sub-figures FIG. 3(a), FIG. 3(b), and FIG. 3(c), and is a diagram showing the inside of a housing according to a first embodiment.
Figure 3:
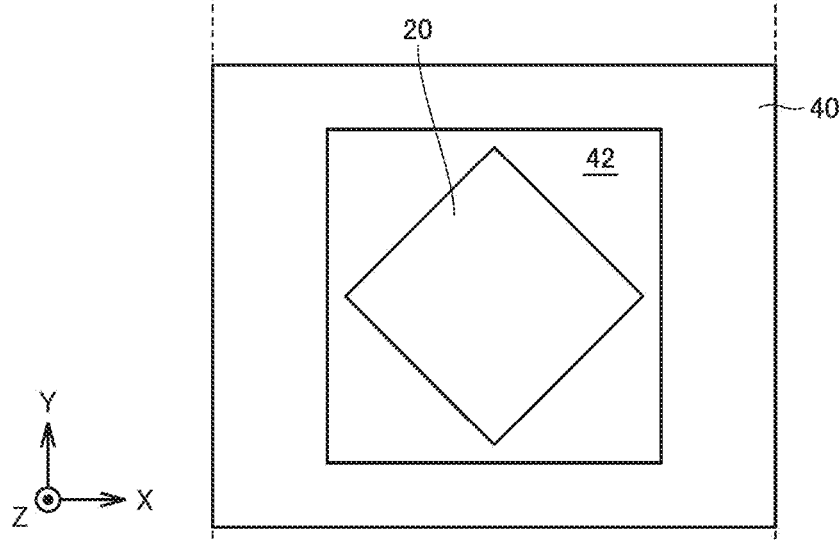
Figure 3:
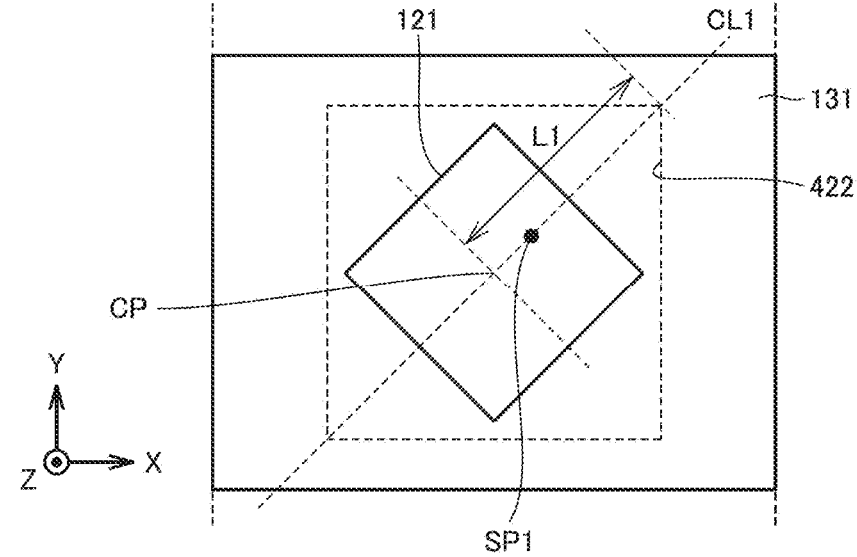

FIG. 3 is a diagram showing the inside of housing 30 according to the first embodiment. In FIG. 3, an upper area (FIG. 3(a)) is a cross-sectional view of communication apparatus 10, an intermediate area (FIG. 3(b)) is a plan view of a heat dissipation plate 40, and a lower area (FIG. 3(c)) is a plan view of antenna module 100. In the following description, the direction normal to antenna element 121 (the direction in which radio waves are radiated) is referred to as a Z-axis direction, and a plane perpendicular to the Z-axis direction is referred to as an XY plane. Further, the positive direction of the Z-axis in each figure may be referred to as an "upper" side while the negative direction of the Z-axis in each figure may be referred to as a "lower" side. In FIG. 3(c), the position of an opening 42 is indicated by a broken line in order to explain the positional relation between opening 42 and antenna element 121.

Referring to FIG. 3, communication apparatus 10 includes heat dissipation plate 40 and an electrode 20 in addition to antenna module 100 and housing 30.

Antenna module 100 includes a dielectric substrate 130, a power feeding line 170, and a ground electrode GND in addition to RFIC 110 and antenna element 121 as a radiating element. In FIG. 3, in order to facilitate explanation, antenna module 100 is described as including one antenna element 121, but antenna module 100 may include two or more antenna elements 121 or antenna elements 121 may be arranged in a one-dimensional arrangement or a two-dimensional arrangement, as will be described later.

Dielectric substrate 130 is, for example; a low temperature co-fired ceramics (LTCC) multilayer substrate; a multilayer resin substrate formed by stacking a plurality of resin layers made of resin such as epoxy or polyimide; a multilayer resin substrate formed by stacking a plurality of resin layers made of liquid crystal polymer (LCP) having a lower dielectric constant; a multilayer resin substrate formed by stacking a plurality of resin layers made of fluorine resin; a multilayer resin substrate formed by stacking a plurality of resin layers made of a polyethylene terephthalate (PET) material; or a ceramic multilayer substrate made of a material other than LTCC. Note that dielectric substrate 130 may not necessarily have a multilayer structure but may be a single-layer substrate. FIG. 3(c) and plan views (described later) do not show dielectric substrate 130 and the power feeding line.

In a layer of dielectric substrate 130 on the side closer to lower surface 132 (a surface in the negative direction of the Z-axis) with respect to antenna element 121, ground electrode GND having a flat plate shape is disposed to face antenna element 121. RFIC 110 is mounted on lower surface 132 of dielectric substrate 130 with solder bumps 140 interposed therebetween. Note that RFIC 110 may be connected to dielectric substrate 130 using a multipolar connector instead of solder connection.

A radio frequency signal is supplied from RFIC 110 to a power feeding point SP1 of antenna element 121 through power feeding line 170. In the example in FIG. 3, antenna element 121 has a quadrangular shape and is disposed such that two sides thereof are inclined with respect to the X-axis in the XY plane. Power feeding point SP1 is located at a position offset in the direction of a broken line CL1 (a first direction) passing through a center point (the intersection of diagonal lines) CP of antenna element 121 and extending in parallel to the sides of antenna element 121. By such a location of power feeding point SP1, radio waves to be polarized in the first direction (the direction of broken line CL1) are radiated.

Power feeding line 170 is formed of: an interconnection pattern formed between layers of dielectric substrate 130; and vias passing through the layers. In antenna module 100, the conductor forming each of the radiating element, the interconnection pattern, the electrode, the vias, and the like is made of metal containing, as main components, aluminum (Al), copper (Cu), gold (Au), silver (Ag), and an alloy thereof.

Heat dissipation plate 40 is disposed between housing 30 and antenna module 100. Heat dissipation plate 40 is provided with opening 42 located to face antenna element 121 of antenna module 100. Heat dissipation plate 40 is a metal plate, for example. The metal plate has high heat conductivity and high heat dissipation performance. The heat from antenna module 100 is diffused in a wide range by heat dissipation plate 40. Consequently, heating of housing 30 can be suppressed.

Further, in the first embodiment, opening 42 and antenna element 121 are disposed in communication apparatus 10 such that a distance L1 from center point CP of antenna element 121 to an edge 422 of opening 42 is maximized in the direction of broken line CL1 (the polarization direction of the radio waves radiated from antenna element 121). This allows the radio waves in the polarization direction to efficiently pass through opening 42, so that the antenna characteristics can be improved.

As will be described later, the positional relation between opening 42 and antenna element 121 is not limited to the positional relation shown in FIG. 3, but opening 42 may be located to face antenna element 121.

Further, opening 42 is larger than antenna element 121 and sized such that antenna element 121 is accommodated inside opening 42, for example, when seen in a plan view in the Z-axis direction. Further, opening 42 is larger than electrode 20 and sized such that electrode 20 is accommodated inside opening 42, for example, when seen in a plan view in the Z-axis direction. In other words, the both the electrode 20 and the antenna 121 are contained within a footprint of the opening 42 in a plan view. Since too large on an area for opening 42 would degrade the heat radiation capability of heat dissipation plate 40, opening 42 is preferably formed to have a necessary and sufficient size so as to allow radiation of the radio waves from antenna element 121 and to allow radiation of the radio waves from electrode 20 serving as a radiation surface.

Electrode 20 is disposed on the side in the positive direction of the Z-axis with respect to antenna element 121 of antenna module 100 and located to face antenna element 121.

Electrode 20 has a resonance frequency close to the resonance frequency of antenna element 121. For example, electrode 20 is preferably identical in shape and size to antenna element 121. Electrode 20 and antenna element 121 are configured to have the same shape and size, and are allowed to have substantially the same resonance frequency. Further, antenna element 121 and electrode 20 preferably have the same resonance frequency. If the resonance frequency of electrode 20 is close to the resonance frequency of antenna element 121, electrode 20 can be different in shape from antenna element 121 or electrode 20 can be different in size from antenna element 121. For example, electrode 20 may have a cross shape.

When electrode 20 is disposed to face antenna element 121, electrode 20 receives radio waves from antenna element 121 and then resonates, and thus, electrode 20 functions as a radiation source (a passive element). Accordingly, electrode 20 serves as a radiation surface of antenna module 100 and thereby can reduce the radio waves shielded by heat dissipation plate 40, with the result that the radiation efficiency for the radio waves can be improved. Further, electrode 20 serves as a radiation surface of antenna module 100, and thereby, the distance from ground electrode GND to the radiation surface can be increased, with the result that the frequency bandwidth can be increased.

In FIG. 3, opening 42 is sized such that electrode 20 is accommodated inside opening 42 when seen in a plan view in the Z-axis direction, and electrode 20 is formed on the same plane as heat dissipation plate 40. More specifically, electrode 20 and heat dissipation plate 40 each are installed in housing 30. By arranging electrode 20 and heat dissipation plate 40 on the same plane, electrode 20 and heat dissipation plate 40 each can be installed in housing 30, so that the installation cost can be reduced. In particular, when electrode 20 and heat dissipation plate 40 are made of the same metal, one metal plate is attached to housing 30 and then a portion between opening 42 and electrode 20 is simply cut out, and thereby, electrode 20 and heat dissipation plate 40 can be installed in housing 30.

As will be described later, electrode 20 and heat dissipation plate 40 do not necessarily have to be disposed on the same plane, but for example, electrode 20 may be disposed above or below heat dissipation plate 40. More specifically, by embedding electrode 20 in housing 30, electrode 20 may be disposed above heat dissipation plate 40. Further, heat dissipation plate 40 may be separated from housing 30 toward antenna element 121, and electrode 20 may be disposed between heat dissipation plate 40 and housing 30.

(Simulation Results)

Figure 4:
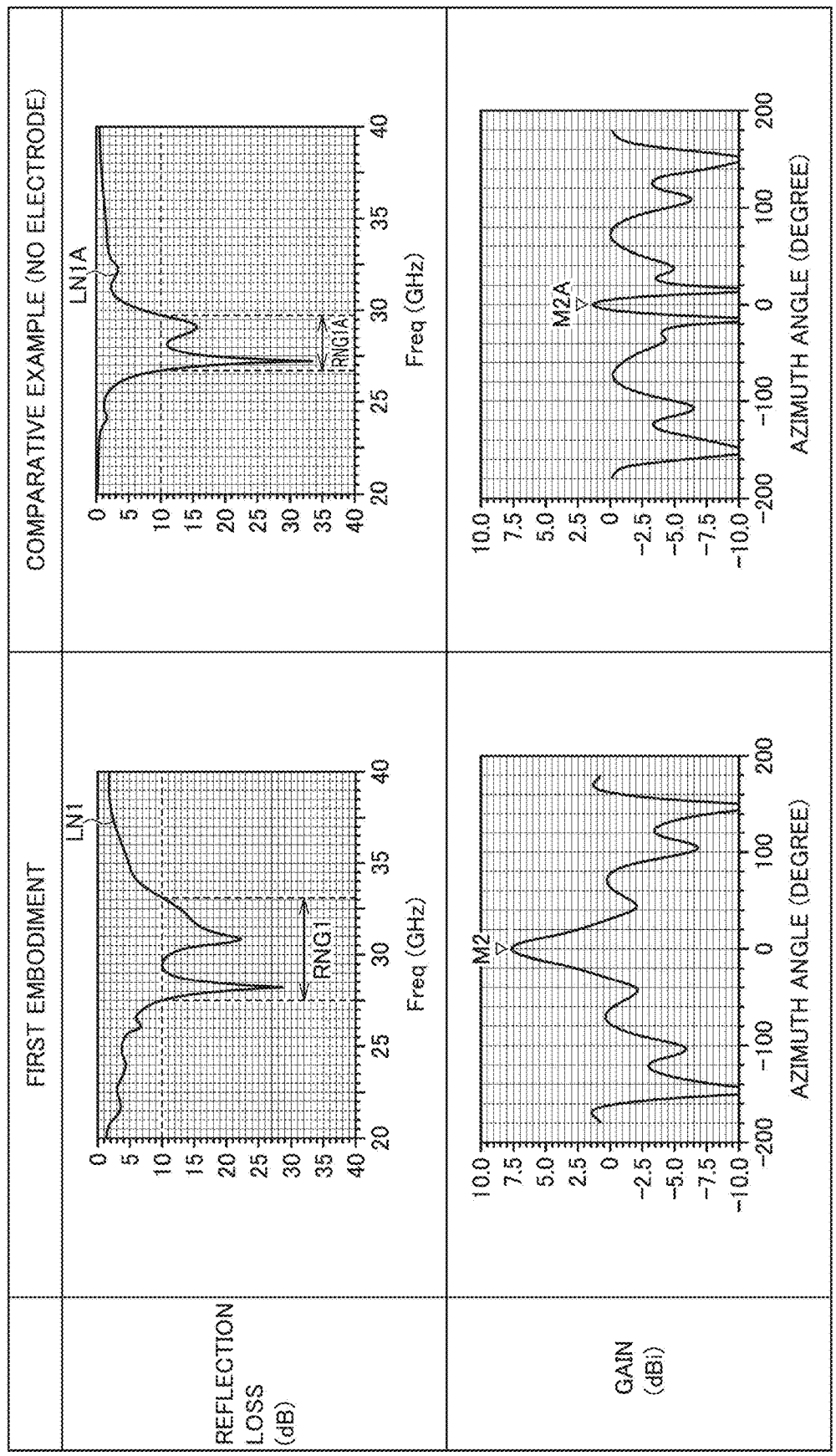
FIG. 4 is a diagram showing simulation results of comparison of antenna characteristics between an antenna module of a communication apparatus according to the first embodiment and an antenna module of a communication apparatus in which no electrode is disposed (a comparative example).

FIG. 4 is a diagram showing simulation results of comparison of antenna characteristics between antenna module 100 of communication apparatus 10 according to the first embodiment and an antenna module of a communication apparatus in which electrode 20 is not disposed (a comparative example). The communication apparatus according to the comparative example is the same as communication apparatus 10 according to the first embodiment in that a heat dissipation plate provided with an opening is disposed between the housing and the antenna module, but is different from communication apparatus 10 according to the first embodiment in that electrode 20 is not disposed.

FIG. 4 shows reflection characteristics (an upper area) and a gain (a lower area). In the following description about an example of the simulation, the frequency band to be used is a millimeter wave frequency band (a GHz band), but the configuration of the present disclosure is applicable also to a frequency band other than a millimeter wave.

Referring to FIG. 4, as to the reflection loss (a line LN1A in FIG. 4) in the comparative example, the frequency band in which the reflection loss can ensure 10 dB is in the range of 26.7 GHz to 29.8 GHz (RNG1A), and the frequency bandwidth is 3.1 GHz. On the other hand, as to the reflection loss (a line LN1 in FIG. 4) in the first embodiment, the frequency band in which the reflection loss can ensure 10 dB is in the range of 27.5 GHz to 33.1 GHz (RNG1), and the frequency bandwidth is 5.6 GHz. Thus, antenna module 100 according to the first embodiment is wider in frequency bandwidth than the antenna module according to the comparative example.

Referring to FIG. 4, the gain (M2) in the direction normal to antenna element 121 (at an azimuth angle of 0 degree) for radiation from antenna module 100 in the first embodiment is higher than the gain (M2A) in the direction normal to the antenna element (at an azimuth angle of 0 degree) for radiation from the antenna module in the comparative example. In this way, antenna module 100 in the first embodiment is higher in antenna gain of radio waves radiated in the direction normal to the antenna element than the antenna module in the comparative example.

By providing electrode 20 located to face antenna element 121 of antenna module 100 as described above, the frequency bandwidth can be increased and the antenna gain can be improved.

Second Embodiment

Figure 5:
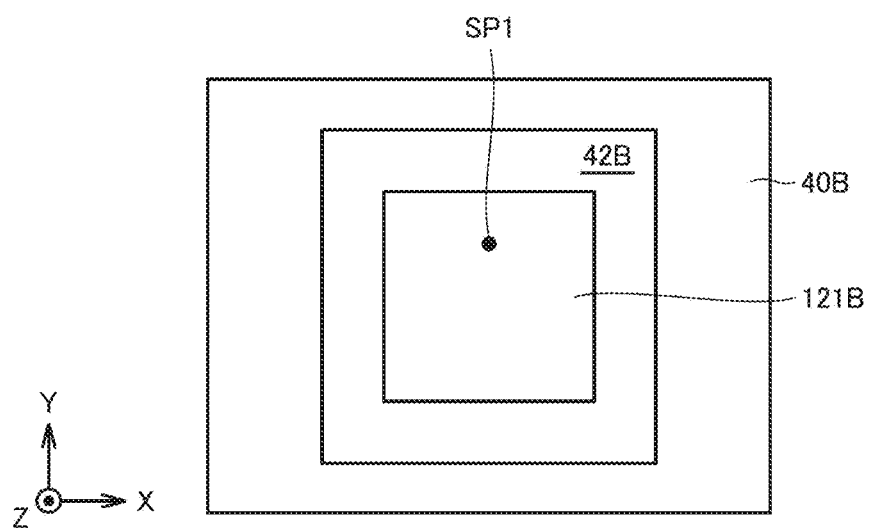
FIG. 5 is a plan view of a heat dissipation plate of a communication apparatus according to a second embodiment.

FIG. 5 is a plan view of a heat dissipation plate 40B of a communication apparatus according to the second embodiment. Note that FIG. 5 does not show an electrode. As shown in FIG. 5, an opening 42B and an antenna element 121B may be arranged in communication apparatus 10 such that the orientation of antenna element 121B coincides with the orientation of opening 42B when seen in a plan view in the Z-axis direction.

More specifically, opening 42B has a quadrangular shape and is located such that, in the XY plane, two sides thereof are parallel to the X-axis and the other two sides thereof are parallel to the Y-axis. Further, antenna element 121B has a quadrangular shape similar in shape to opening 42B and is disposed such that, in the XY plane, two sides thereof are parallel to the X-axis and the other two sides thereof are parallel to the Y-axis. In other words, antenna element 121B is similar in shape to opening 42B. Further, each of the sides of antenna element 121B is located to be parallel to a corresponding one of the sides of opening 42B.

As described above, the positional relation between the opening and the antenna element is not limited to the relation described in the first embodiment.

Third Embodiment

Figure 6:
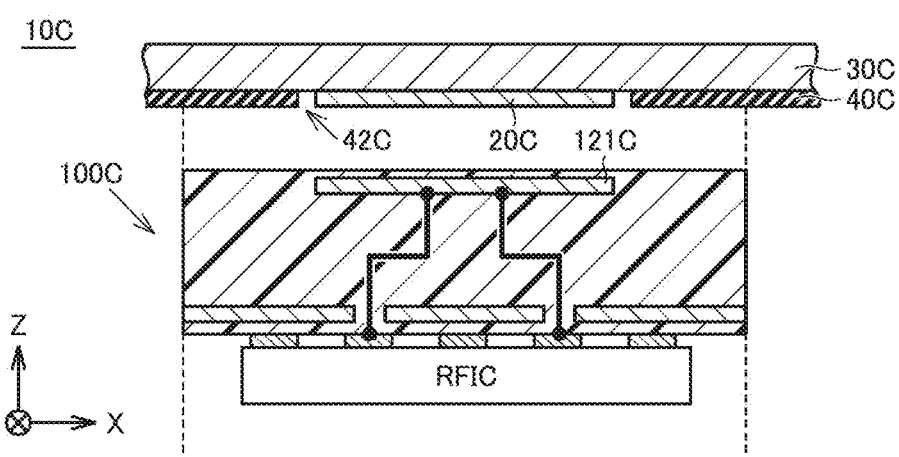
FIG. 6 includes two related sub-figures FIG. 6(a), and FIG. 6(b), and is a diagram showing the inside of a housing of a communication apparatus according to a third embodiment.
Figure 6:
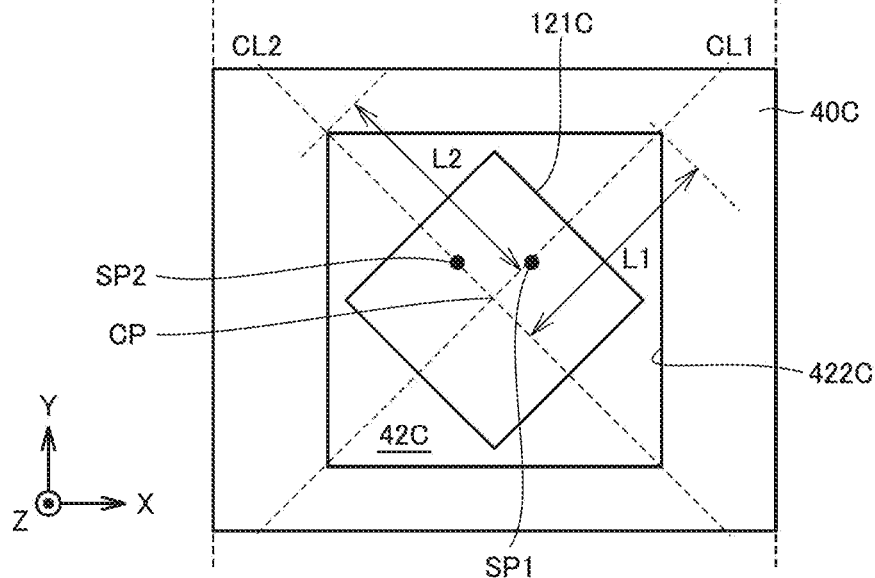

FIG. 6 is a diagram showing the inside of a housing 30C of a communication apparatus 10C according to the third embodiment. In FIG. 6, an upper area (FIG. 6(a)) is a cross-sectional view of communication apparatus 10C, and a lower area (FIG. 6(b)) is a plan view of a heat dissipation plate 40C. Note that FIG. 6(b) does not show an electrode 20C.

In an antenna element 121C of antenna module 100C, a radio frequency signal is supplied also to a power feeding point SP2 in addition to power feeding point SP1.

The polarization direction of the radio waves radiated by the radio frequency signal supplied to power feeding point SP1 is different from the polarization direction of the radio waves radiated by the radio frequency signal supplied to power feeding point SP2. More specifically, power feeding point SP1 is located at a position offset in the direction of a broken line CL1 (the first direction) passing through center point (the intersection of diagonal lines) CP of antenna element 121C and extending in parallel to the sides of antenna element 121C. By such a location of power feeding point SP1, radio waves to be polarized in the first direction (the direction of broken line CL1) are radiated. Power feeding point SP2 is located at a position offset in the direction of a broken line CL2 (a second direction) passing through center point CP of antenna element 121C and orthogonal to the first direction (the direction of broken line CL1). By such a location of power feeding point SP2, radio waves to be polarized in the second direction (the direction of broken line CL2) orthogonal to the first direction are radiated.

In other words, antenna element 121C of antenna module 100C is a dual polarization-type antenna module configured to be capable of radiating not only the radio waves to be polarized in the first direction but also the radio waves to be polarized in the second direction. Note that antenna element 121C illustrated in FIG. 6 is capable of radiating radio waves in two orthogonal directions, but the first direction may not be orthogonal to the second direction.

The positional relation between antenna element 121C and opening 42C will be hereinafter described with reference to FIG. 6(b). A distance L1 in FIG. 6(b) is the shortest distance from center point CP of antenna element 121C to an edge 422C of opening 42C in the direction of broken line CL1 (in the first direction among the polarization directions of the radio waves radiated from antenna element 121C). A distance L2 in FIG. 6(b) is the shortest distance from center point CP of antenna element 121C to edge 422C of opening 42C in the direction of broken line CL2 (in the second direction among the polarization directions of the radio waves radiated from antenna element 121C). Opening 42C and antenna element 121C are arranged in communication apparatus 10C such that distance L1 is equal to distance L2.

By arranging opening 42C and antenna element 121C in communication apparatus 10C such that distance L1 is equal to distance L2 as describe above, the range in which heat dissipation plate 40C shields the polarization in the first direction become approximately the same as the range in which heat dissipation plate 40C shields the polarization in the second direction. As a result, extreme degradation in characteristics of one of the polarizations can be suppressed.

Further, in the present embodiment, heat dissipation plate 40C and antenna element 121C are disposed inside the housing such that the symmetry axis of antenna element 121C coincides with the symmetry axis of opening 42 when seen in a plan view. Further, power feeding points SP1 and SP2 are arranged symmetric with respect to the diagonal line of antenna element 121C as a symmetry axis that is parallel to the Y-axis. Thus, the symmetry of the current flowing through the conductor and the symmetry of the electromagnetic field around the conductor are maintained, so that isolation between the power feeding points can be maintained.

As in the first embodiment, opening 42C and antenna element 121C may be arranged in communication apparatus 10C such that distance L1 is maximized. Further, opening 42C and antenna element 121C may be arranged in communication apparatus 10C such that distance L2 is maximized.

Fourth Embodiment

Figure 7:
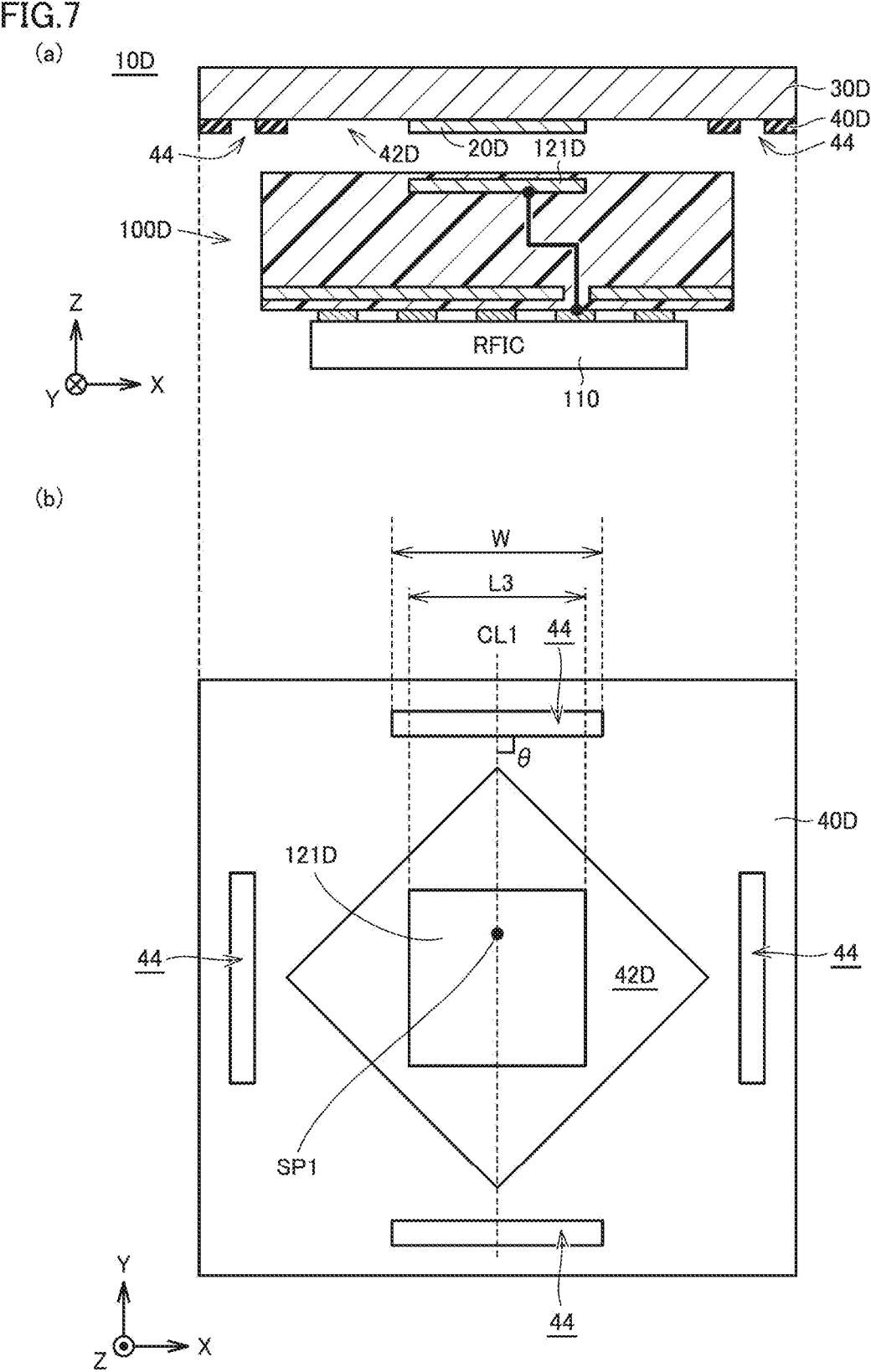
FIG. 7 includes two related sub-figures FIG. 7(a), and FIG. 7(b), and is a diagram showing the inside of a housing of a communication apparatus according to a fourth embodiment.

FIG. 7 is a diagram showing the inside of a housing 30D of a communication apparatus 10D according to the fourth embodiment. In FIG. 7, an upper area (FIG. 7(a)) is a cross-sectional view of communication apparatus 10D, and a lower area (FIG. 7(b)) is a plan view of a heat dissipation plate 40D. Note that FIG. 7(b) does not show an electrode 20D.

Referring to FIG. 7, heat dissipation plate 40D is provided with a slit 44 in addition to an opening 42D. Slit 44 is a rectangular elongated opening. Slits 44 are provided around opening 42D. In FIG. 7, slit 44 is provided along each of the sides in four directions around opening 42D, and thus, a total of four slits 44 are provided for one opening 42D.

More specifically, each of two slits 44 is arranged at a position opposite to one side of antenna element 121D that is parallel to the X-axis and is arranged such that the long side thereof is parallel to the X-axis. Further, each of the other two slits 44 is arranged at a position opposite to one side of antenna element 121D that is parallel to the Y-axis and is arranged such that the long side thereof is parallel to the Y-axis.

Each slit 44 is preferably provided at least in the polarization direction of the radio waves radiated from antenna element 121D (in the direction of broken line CL1 in the figure). By providing each slit 44 in the polarization direction of the radio waves radiated from antenna element 121D, the range of shielding by heat dissipation plate 40D with respect to the polarization direction is narrowed, so that the antenna characteristics are improved.

Further, each slit 44 is preferably provided such that the long side thereof is orthogonal to the polarization direction of the radio waves radiated from antenna element 121D. The term "orthogonal" has a well-known definition, but in alternative embodiments the orientation need not strictly be 90 degrees and, for example, an angle θ formed by the long side of each slit 44 and broken line CL1 may be 45 degrees<θ<135 degrees. By setting angle θ formed between the long side of each slit 44 and broken line CL1 to be 90 degrees, the symmetry of the antenna characteristic can be maintained.

When seen in a plan view in the Z-axis direction, a width W of slit 44 is preferably longer than a length L3 of one side of antenna element 121D located opposite to slit 44. By setting width W of slit 44 to be longer than length L3 of one side of antenna element 121D as described above, the shielding range with respect to the polarization direction is narrowed, so that the antenna characteristics are improved.

Slit 44 also functions as a slit antenna. Thus, width W of slit 44 is preferably equal to a length of a half wavelength of the operating frequency in the electrical length of antenna element 121D. By setting width W of slit 44 to be equal to a length of the half wavelength as described above, the radio waves substantially equal in frequency to the radio waves radiated from antenna element 121D can be radiated from slit 44 functioning as a slit antenna.

Figure 8:
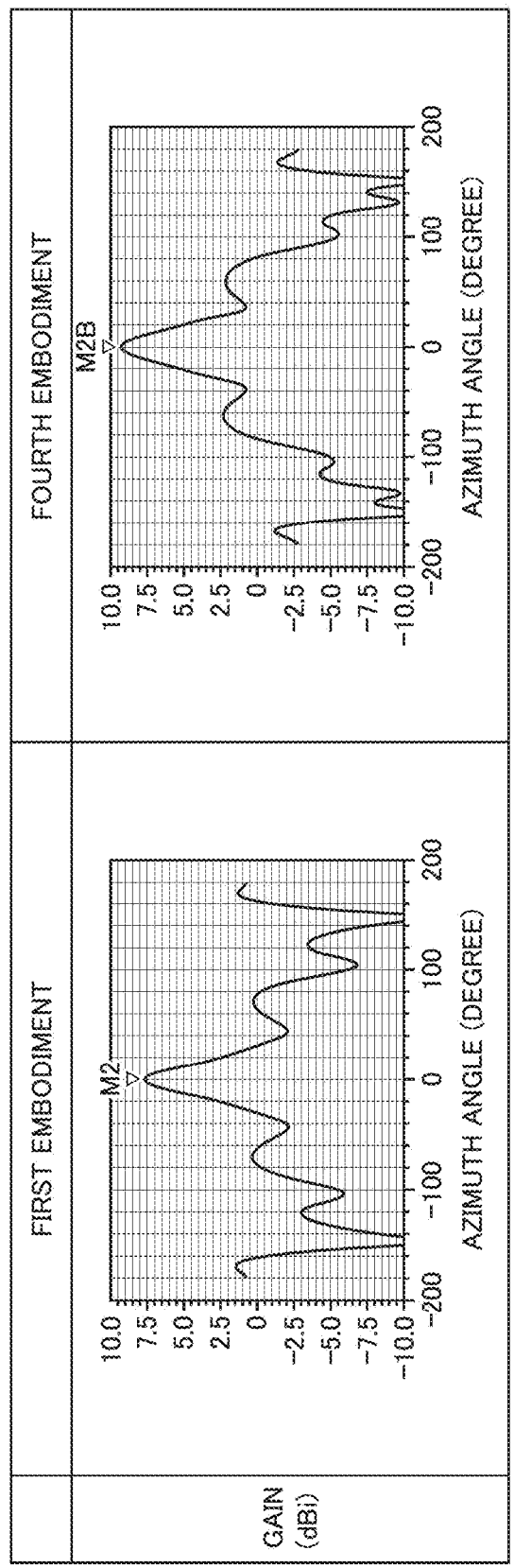
FIG. 8 is a diagram showing simulation results of comparison of antenna characteristics between the antenna module of the communication apparatus according to the first embodiment and an antenna module of the communication apparatus according to the fourth embodiment.

FIG. 8 is a diagram showing simulation results of comparison of antenna characteristics between antenna module 100 of communication apparatus 10 according to the first embodiment and an antenna module 100D of a communication apparatus 10D according to the fourth embodiment.

Referring to FIG. 8, the gain (M2B) in the direction normal to antenna element 121D (at an azimuth angle of 0 degree) for radiation from antenna module 100D in the fourth embodiment is higher than the gain (M2) in the direction normal to antenna element 121 (at an azimuth angle of 0 degree) for radiation from antenna module 100 in the first embodiment. By providing the heat dissipation plate with slits 44 in addition to the opening as described above, the antenna gain can be improved, so that the antenna characteristics are improved.

Fifth Embodiment

Figure 9:
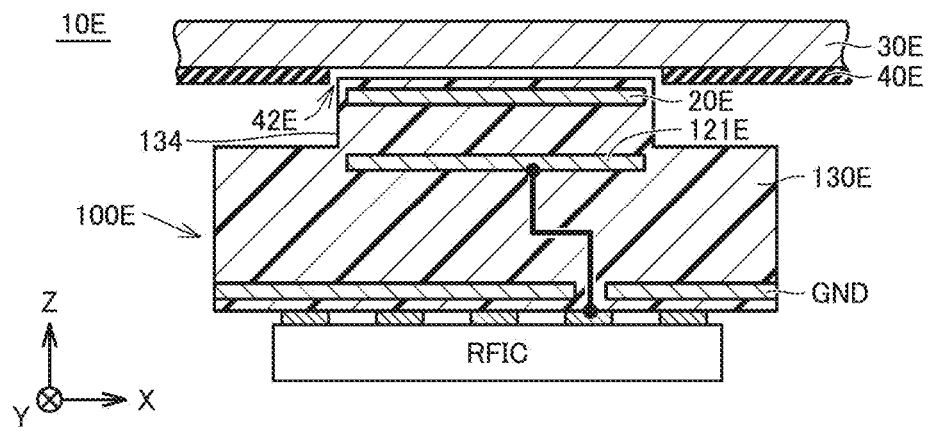
FIG. 9 is a cross-sectional view of a communication apparatus according to a fifth embodiment.

FIG. 9 is a cross-sectional view of a communication apparatus 10E according to the fifth embodiment. In the first to fourth embodiments, the electrode is formed separately from the antenna module. Note that the electrode may be provided in antenna module 100E. More specifically, an electrode 20E is disposed in a dielectric substrate 130E. In other words, electrode 20E and an antenna element 121E are integrally mounted on dielectric substrate 130E.

As compared with the case where antenna element 121E and electrode 20E are not integrally provided, when antenna element 121E and electrode 20E are integrally provided as described above, for example, the distance between antenna element 121E and electrode 20E, the electrical coupling between antenna element 121E and electrode 20E, and the like can be readily controlled, with the result that the performance of antenna module 100E can be improved. Further, when antenna element 121E and electrode 20E are integrally provided, antenna element 121E and electrode 20E do not have to be aligned with each other during assembly, with the result that the variations in each communication apparatus 10E can be suppressed and the assembly cost can also be reduced.

Dielectric substrate 130E has a protrusion 134. Electrode 20E is disposed in protrusion 134. When the dielectric substrates of both side surfaces of protrusion 134 are cut away, the effective dielectric constant from electrode 20E to antenna element 121E can be reduced as compared with the case where an electrode is disposed on a dielectric substrate having a rectangular parallelepiped shape. As a result, the frequency bandwidth can be increased. Further, in dielectric substrate 130E, the dielectric substrates of both side surfaces of protrusion 134 are cut away, so that the volume of the dielectric can be reduced. By reducing the volume of the dielectric as described above, the antenna loss caused by the dielectric is reduced, with the result that the antenna performance can be improved.

Similarly to the electrode in the communication apparatus according to each of the first to fourth embodiments, electrode 20E is disposed to face antenna element 121E in the direction in which the radio waves are radiated from antenna element 121E. As a result, electrode 20E is to be located to face an opening 42E. In each of the above-described first to fourth embodiments, the heat dissipation plate and the electrode are formed on the same plane, but electrode 20E may be disposed below heat dissipation plate 40E as shown in FIG. 9.

Sixth Embodiment

Figure 10:
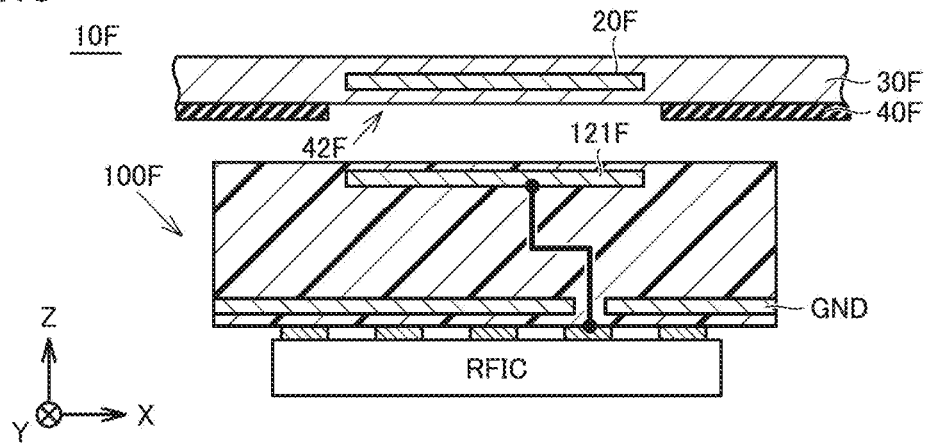
FIG. 10 is a cross-sectional view of a communication apparatus according to a sixth embodiment.

FIG. 10 is a cross-sectional view of a communication apparatus 10F according to the sixth embodiment. In each of the first to fourth embodiments, the electrode is formed separately from the housing. Note that the electrode may be formed integrally with the housing. Specifically, an electrode 20F is disposed inside a housing 30F and integrated with housing 30F.

Similarly to the electrode in the communication apparatus according to each of the first to fourth embodiments, electrode 20F is disposed to face antenna element 121F in the direction in which the radio waves are radiated from antenna element 121F. As a result, electrode 20F is to be located to face opening 42F. In each of the above-described first to fourth embodiments, the heat dissipation plate and the electrode are formed on the same plane, but electrode 20F may be disposed above heat dissipation plate 40F as shown in FIG. 10.

By disposing electrode 20F inside housing 30F as described above, the distance from ground electrode GND to the radiation surface (electrode 20F) can be ensured even if antenna module 100F is located close to housing 30F to reduce the thickness of the communication apparatus.

Seventh Embodiment

Figure 11:
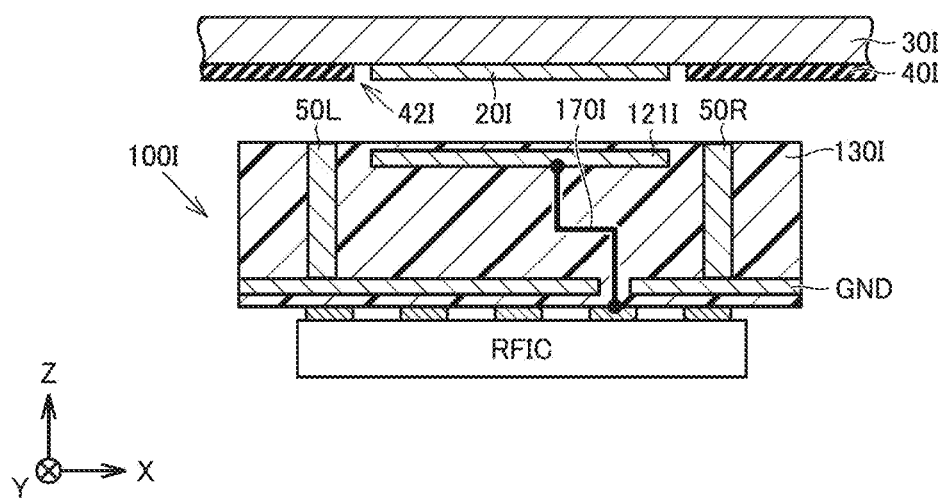
FIG. 11 is a cross-sectional view of a communication apparatus according to a seventh embodiment.

FIG. 11 is a cross-sectional view of a communication apparatus 10I according to the seventh embodiment. Each of the first to sixth embodiments has been described with regard to the configuration in which the antenna element, the power feeding line, and the ground electrode are included in the dielectric substrate. The dielectric substrate may further include other elements. More specifically, a dielectric substrate 130I in communication apparatus 10I includes an antenna element 121I, a power feeding line 170I, and a ground electrode GND as well as vias 50R and 50L. Vias 50R and 50L are thermal vias each having an effect of heat exhaustion. Vias 50R and 50L are arranged around antenna element 121I and spaced apart from antenna element 121I. Specifically, via 50R is located on the side in the positive direction of the X-axis with respect to antenna element 121I, and via 50L is located on the side in the negative direction of the X-axis with respect to antenna element 121I. Vias 50R and 50L may be located, for example, to overlap with antenna element 121I when seen in a side view in the Y-axis direction of antenna element 121I. Vias 50R and 50L are located between a heat dissipation plate 40I and the RFIC. Vias 50R and 50L are desirably located to overlap with heat dissipation plate 40I when seen in a plan view in the Z-axis direction.

Vias 50L and 50R each are filled with a medium higher in heat conductivity than at least dielectric substrate 130I. In the example in FIG. 11, for example, vias 50R and 50L each are filled with metal such as copper. Note that the medium filling each of vias 50R and 50L is not limited to metal but may be air, for example. The heat generated from the RFIC is more efficiently transmitted to heat dissipation plate 40I through a medium higher in heat conductivity than dielectric substrate 130I. In other words, in communication apparatus 10I, the heat generated from the RFIC can be readily transmitted to heat dissipation plate 40I. Thus, in communication apparatus 10I according to the seventh embodiment, heating of housing 30 can be more efficiently suppressed.

Further, as shown in FIG. 11, the metal filling each of vias 50R and 50L is connected to ground electrode GND. Thereby, the metal filling each of vias 50R and 50L becomes equal in potential to ground electrode GND, and surface waves can be suppressed. The metal filling each of vias 50R and 50L may not be connected to ground electrode GND.

Eighth Embodiment

Figure 12:
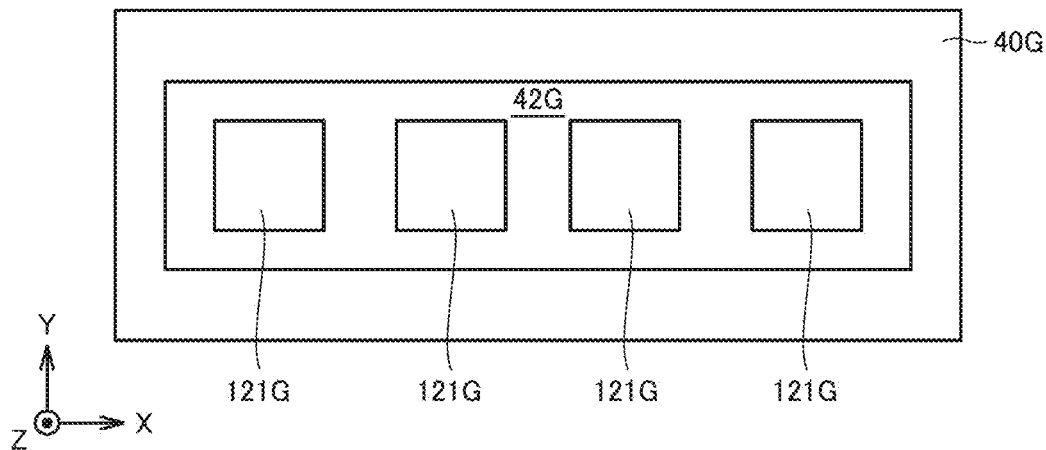
FIG. 12 is a plan view of a heat dissipation plate of a communication apparatus according to an eighth embodiment.

FIG. 12 is a plan view of a heat dissipation plate 40G of a communication apparatus according to the eighth embodiment. Note that FIG. 12 does not show an electrode and a power feeding point. As shown in FIG. 12, the antenna module may include a plurality of antenna elements 121G. In this case, heat dissipation plate 40G may be provided with one large opening 42G to be located to face all of the plurality of antenna elements 121G.

When the plurality of antenna elements 121G are provided as described above, the antenna gain of the antenna module can be improved by aligning antenna elements 121G with each other, and also, the direction and the shape of the radio wave radiated from the antenna module can be controlled by adjusting the phase difference between antenna elements 121. Further, even when one large opening 42G is provided, the heat from the antenna module can be diffused in a wide range by heat dissipation plate 40G, so that heating of the housing can be suppressed. Further, providing one large opening 42G requires less time and effort than providing an opening in each of the plurality of antenna elements 121G.

Note that opening 42G is preferably sized such that all of antenna elements 121G are accommodated inside opening 42G when seen in a plan view in the Z-axis direction. Further, in the example shown in FIG. 12, the plurality of antenna elements 121G are arranged in a line but may be arranged in a two-dimensional arrangement.

Ninth Embodiment

Figure 13:
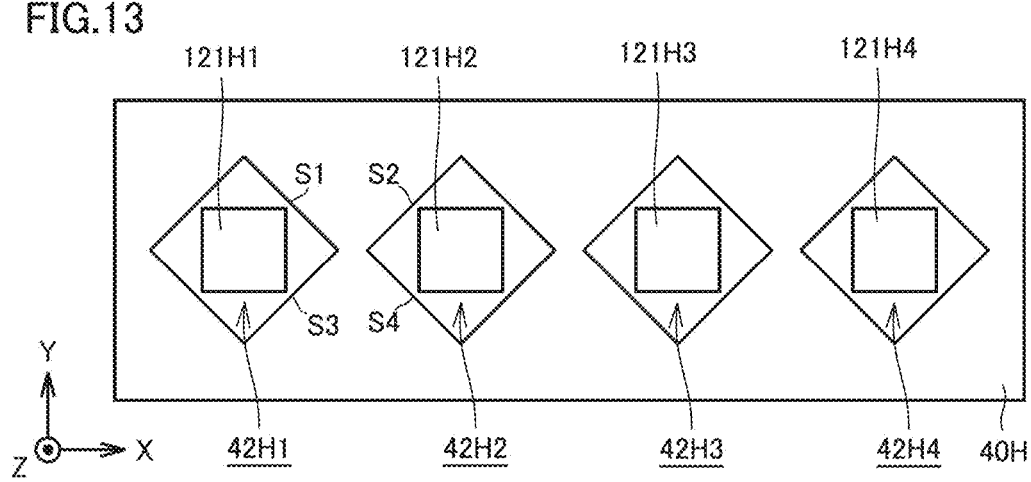
FIG. 13 is a plan view of a heat dissipation plate of a communication apparatus according to a ninth embodiment.

FIG. 13 is a plan view of a heat dissipation plate 40H of a communication apparatus according to the ninth embodiment. Note that FIG. 13 does not show an electrode and a power feeding point. As shown in FIG. 13, when the antenna module includes a plurality of antenna elements 121H1, 121H2, 121H3, and 121H4, heat dissipation plate 40H may be provided with openings (openings 42H1, 42H2, 42H3, and 42H4) that are separately provided in antenna elements 121H1, 121H2, 121H3, and 121H4, respectively.

When antenna elements 121H1 to 121H4 are provided as described above, the antenna gain of the antenna module can be improved by aligning the antenna elements with each other, and also, the direction and the shape of the radio wave radiated from the antenna module can be controlled by adjusting the phase difference between the antenna elements. Further, the range of the opening in heat dissipation plate 40H is narrower than that in the case where one large opening (opening 42G in FIG. 12) is provided. Thus, the area of heat dissipation plate 40H can be ensured, and a higher heat dissipation effect can be achieved as compared with the case where one large opening is provided.

As shown in FIG. 13, each of openings 42H1 to 42H4 has a quadrangular shape. Openings 42H1 to 42H4 each are inclined with respect to the directions in which antenna elements 121H1 to 121H4 are respectively arranged (in the X-axis direction). Further, regarding the positional relation between openings 42H1 to 42H4 as will be described from another viewpoint, the openings adjacent to each other in the arrangement direction of the antenna elements are provided such that the sides of the openings adjacent to each other (sides S1 and S2 or sides S3 and S4 in FIG. 13) are not parallel to each other.

In the example shown in FIG. 13, the antenna module includes four antenna elements 121H1 to 121H4, but may include three or less antenna elements or five or more antenna elements. Further, the plurality of antenna elements are arranged in a line but may be arranged in a two-dimensional arrangement.

Tenth Embodiment

Figure 14:
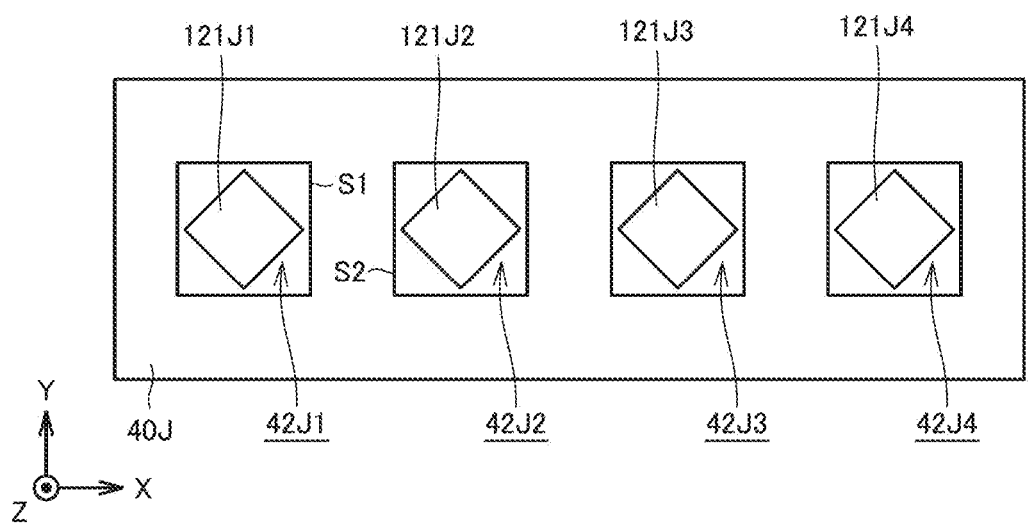
FIG. 14 is a plan view of a heat dissipation plate of a communication apparatus according to a tenth embodiment.

FIG. 14 is a plan view of a heat dissipation plate 40J of a communication apparatus according to the tenth embodiment. Note that FIG. 14 does not show an electrode and a power feeding point. The antenna module includes a plurality of antenna elements 121J1, 121J2, 121J3, and 121J4. Further, heat dissipation plate 40J is provided with openings (openings 42J1, 42J2, 42J3, and 42J4) that are separately provided in antenna elements 121J1, 121J2, 121J3, and 121J4, respectively.

When antenna elements 121J1 to 121J4 are provided as described above, the antenna gain of the antenna module can be improved by aligning these antenna elements with each other, and also, the direction and the shape of the radio wave radiated from the antenna module can be controlled by adjusting the phase difference between the antenna elements. Further, the range of the opening in heat dissipation plate 40J is narrower than that in the case where one large opening (opening 42G in FIG. 12) is provided. Thus, the area of heat dissipation plate 40J can be ensured, and a higher heat dissipation effect can be achieved as compared with the case where one large opening is provided.

In the communication apparatus according to the tenth embodiment, openings 42J1 and 42J2 are provided such that a side S1 of opening 42J1 is parallel to a side S2 of opening 42J2 that is adjacent to side S1 when seen in a plan view in the Z-axis direction.

In the example shown in FIG. 14, the antenna module includes four antenna elements 121J1 to 121J4, but may include three or less antenna elements or five or more antenna elements. Further, the plurality of antenna elements are arranged in a line but may be arranged in a two-dimensional arrangement.

It should be understood that the embodiments disclosed herein are illustrative and non-restrictive in every respect. The scope of the present disclosure is defined by the terms of the claims, rather than the above description of the embodiments, and is intended to include any modifications within the meaning and scope equivalent to the terms of the claims.

REFERENCE SIGNS LIST 10, 10C to 10E, 10I communication apparatus, 20, 20C to 20F, 20I electrode, 30, 30C to 30F, 30I housing, 32 display, 40, 40C to 40J, heat dissipation plate, 42, 42B to 42J4 opening, 44 slit, 50L, 50R via, 100, 100C to 100F, 100I antenna module, 111A to 111D, 113A to 113D, 117 switch, 112AR to 112DR low-noise amplifier, 112AT to 112DT power amplifier, 114A to 114D attenuator, 115A to 115D phase shifter, 116 signal combiner/splitter, 118 mixer, 119 amplifier circuit, 120 antenna device, 121, 121B to 121J4 antenna element, 130, 130E, 130I dielectric substrate, 132 lower surface, 134 protrusion, 140 solder bump, 170, 170I power feeding line, 200 BBIC, 422, 422C edge, GND ground electrode, SP1, SP2 power feeding point.

The invention claimed is:

1. A communication apparatus comprising:
   an antenna module provided with a first radiating element having a flat plate shape and capable of radiating a radio wave to be polarized in a first direction;
   a housing that accommodates the antenna module;
   a heat dissipation plate disposed between the housing and the antenna module and provided with a first opening that faces the first radiating element; and
   a first electrode that faces the first radiating element in a direction normal to the first radiating element and on a side of the first radiating element that radiates the radio wave,
   wherein the first opening is positioned such that a shortest distance from a center point of the first radiating element to an edge of the first opening is maximized in the first direction from a plan view in the direction normal to the first radiating element.

2. The communication apparatus according to claim 1, wherein the first opening is sized such that the first electrode is accommodated inside the first opening from a plan view in the direction normal to the first radiating element.

3. The communication apparatus according to claim 2, wherein the heat dissipation plate and the first electrode are disposed on a same plane.

4. The communication apparatus according to claim 2, wherein the first electrode is equal in resonance frequency to the first radiating element.

5. The communication apparatus according to claim 2, wherein the first electrode is identical in shape and size to the first radiating element.

6. The communication apparatus according to claim 1, wherein the first electrode is equal in resonance frequency to the first radiating element.

7. The communication apparatus according to claim 1, wherein the first electrode is identical in shape and size to the first radiating element.

8. The communication apparatus according to claim 1, wherein the first radiating element is capable of radiating a polarized wave in a second direction different from the first direction.

9. The communication apparatus according to claim 8, wherein, from a plan view in the direction normal to the first radiating element, a first distance is equal to a second distance under a condition the first distance is a shortest distance from a center point of the first radiating element to an edge of the first opening in the first direction, and the second distance is a shortest distance from a center point of the first radiating element to an edge of the first opening in the second direction.

10. The communication apparatus according to claim 1, wherein the heat dissipation plate includes at least one slit around the first opening.

11. The communication apparatus according to claim 10, wherein the slit is provided in the first direction from a plan view in the direction normal to the first radiating element.

12. The communication apparatus according to claim 11, wherein the slit is provided such that a long side of the slit is orthogonal to the first direction from the plan view in the direction normal to the first radiating element.

13. The communication apparatus according to claim 1, wherein
the antenna module includes a dielectric, and
each of the first radiating element and the first electrode is disposed in the dielectric.

14. The communication apparatus according to claim 1, wherein the first electrode is disposed inside the housing.

15. The communication apparatus according to claim 1, wherein
the antenna module is further provided with a second radiating element,
the communication apparatus further comprises a second electrode that faces the second radiating element, and
the first opening faces the first radiating element and the second radiating element.

16. The communication apparatus according to claim 1, wherein
the antenna module is further provided with a second radiating element,
the communication apparatus further comprises a second electrode that faces the second radiating element, and
the heat dissipation plate is further provided with a second opening that faces the second radiating element.

17. The communication apparatus according to claim 16, wherein
each of the first opening and the second opening has a quadrangular shape, and
the first opening and the second opening are inclined with respect to a direction in which the first radiating element and the second radiating element, respectively, are arranged.

18. The communication apparatus according to claim 16, wherein
each of the first opening and the second opening has a quadrangular shape, and
the first opening and the second opening are disposed such that one side of the first opening is parallel to one side of the second opening that is adjacent to the one side of the first opening.

* * * * *